US008503984B2

(12) United States Patent
Winbush, III

(10) Patent No.: US 8,503,984 B2
(45) Date of Patent: Aug. 6, 2013

(54) MOBILE COMMUNICATION DEVICE USER CONTENT SYNCHRONIZATION WITH CENTRAL WEB-BASED RECORDS AND INFORMATION SHARING SYSTEM

(76) Inventor: Amos Winbush, III, New York, NY (US)

( * ) Notice: Subject to any disclaimer, the term of this patent is extended or adjusted under 35 U.S.C. 154(b) by 551 days.

(21) Appl. No.: 12/645,847

(22) Filed: Dec. 23, 2009

(65) Prior Publication Data

US 2011/0151837 A1 Jun. 23, 2011

(51) Int. Cl.
*H04M 3/16* (2006.01)
(52) U.S. Cl.
USPC ........ 455/412; 455/418; 455/414.1; 709/226; 707/621
(58) Field of Classification Search
USPC ...... 455/412.1, 414.1, 418; 709/226; 707/621
See application file for complete search history.

(56) References Cited

U.S. PATENT DOCUMENTS

| | | | |
|---|---|---|---|
| 5,684,990 A | 11/1997 | Boothby | 395/619 |
| 5,832,489 A | 11/1998 | Kucala | 707/10 |
| 5,974,238 A | 10/1999 | Chase, Jr. | 395/200.78 |
| 6,000,000 A | 12/1999 | Hawkins et al. | 707/201 |
| 6,006,274 A | 12/1999 | Hawkins et al. | 709/248 |
| 6,034,621 A | 3/2000 | Kaufman | 340/825.44 |
| 6,377,958 B1 | 4/2002 | Orcutt | 707/200 |
| 6,671,757 B1 | 12/2003 | Multer et al. | 710/100 |
| 6,901,434 B1 | 5/2005 | Lunsford et al. | 709/216 |
| 6,909,457 B1 | 6/2005 | Fukasawa | 348/211.11 |
| 7,031,722 B2 | 4/2006 | Naghian | 455/456.1 |
| 8,081,963 B2 | 12/2011 | Aftab et al. | 455/419 |
| 8,090,402 B1 | 1/2012 | Fujisaki | 455/556.1 |
| 2002/0169830 A1 | 11/2002 | Mild et al. | 709/203 |
| 2003/0139175 A1 | 7/2003 | Kim | 455/419 |
| 2003/0182327 A1* | 9/2003 | Ramanujam et al. | 707/204 |
| 2003/0220966 A1 | 11/2003 | Hepper et al. | 709/203 |
| 2004/0172423 A1 | 9/2004 | Kaasten et al. | 707/201 |
| 2005/0044165 A1* | 2/2005 | O'Farrell et al. | 709/213 |
| 2005/0073389 A1 | 4/2005 | Chandley | 340/5.31 |
| 2005/0102329 A1 | 5/2005 | Jiang et al. | 707/204 |
| 2005/0186989 A1 | 8/2005 | Cocita | 455/558 |
| 2005/0191998 A1 | 9/2005 | Onyon et al. | 455/419 |
| 2005/0251540 A1 | 11/2005 | Sim-Tang | 707/202 |
| 2005/0262097 A1 | 11/2005 | Sim-Tang et al. | 707/10 |
| 2005/0262146 A1 | 11/2005 | Grace et al. | 707/104.1 |
| 2006/0031541 A1 | 2/2006 | Koch et al. | 709/229 |
| 2006/0041603 A1 | 2/2006 | Paterson et al. | 707/204 |
| 2006/0094419 A1 | 5/2006 | Katou | 455/425 |

(Continued)

OTHER PUBLICATIONS

Wikipedia contributors. "Mobileme." Wikipedia, The Free Encyclopedia, Aug. 12, 2008. Web. Feb. 10, 2012.

(Continued)

*Primary Examiner* — Danh Le
(74) *Attorney, Agent, or Firm* — Ostrolenk Faber LLP

(57) ABSTRACT

A mobile communication terminal communicates with a central node to provide automatically synchronization of user content stored on a mobile device with user content stored at a central node, such as at a synchronization server. In this way, automatic two-way synching may be provided, the user may monitor, view, update, change, add to or delete all or any field of user content using a web interface stored for a mobile device at a central node such as at a synchronization server cloud or data storage cloud, using a remote device, including an off-line device. Current location of the mobile terminal may also be tracked at the central node.

33 Claims, 16 Drawing Sheets

U.S. PATENT DOCUMENTS

| | | | | |
|---|---|---|---|---|
| 2006/0101064 A1 | 5/2006 | Strong et al. | | 707/102 |
| 2006/0149794 A1 | 7/2006 | Ylinen | | 707/203 |
| 2006/0168351 A1 | 7/2006 | Ng et al. | | 709/248 |
| 2006/0173954 A1 | 8/2006 | Maeda et al. | | 709/203 |
| 2006/0174017 A1* | 8/2006 | Robertson | | 709/229 |
| 2006/0184591 A1 | 8/2006 | Backholm et al. | | 707/204 |
| 2006/0189348 A1 | 8/2006 | Montulli et al. | | 348/371 |
| 2006/0206533 A1 | 9/2006 | MacLaurin et al. | | 707/200 |
| 2006/0206583 A1 | 9/2006 | Hill | | 709/218 |
| 2006/0218224 A1 | 9/2006 | Agrawal et al. | | 709/201 |
| 2006/0234679 A1 | 10/2006 | Matsumoto et al. | | 455/411 |
| 2006/0276168 A1 | 12/2006 | Fuller, Jr. et al. | | 455/404.2 |
| 2007/0021112 A1 | 1/2007 | Byrne et al. | | 455/419 |
| 2007/0037585 A1 | 2/2007 | Shim | | 455/456.1 |
| 2007/0038857 A1 | 2/2007 | Gosnell | | 713/165 |
| 2007/0072624 A1 | 3/2007 | Niemenmaa et al. | | 455/456.1 |
| 2007/0117574 A1 | 5/2007 | Watanabe | | 455/456.1 |
| 2007/0149208 A1 | 6/2007 | Syrbe et al. | | 455/456.1 |
| 2007/0180075 A1 | 8/2007 | Chasman et al. | | 709/223 |
| 2007/0255854 A1 | 11/2007 | Khosravy et al. | | 709/248 |
| 2007/0298761 A1 | 12/2007 | Bani Hani | | 455/404.2 |
| 2008/0114855 A1 | 5/2008 | Welingkar et al. | | 709/217 |
| 2008/0115226 A1 | 5/2008 | Welingkar et al. | | 726/28 |
| 2008/0120369 A1 | 5/2008 | Gustavsson | | 348/222.1 |
| 2008/0162501 A1* | 7/2008 | Tysowski et al. | | 707/100 |
| 2008/0162597 A1* | 7/2008 | Tysowski et al. | | 707/204 |
| 2008/0233919 A1 | 9/2008 | Kenney | | 455/411 |
| 2009/0037484 A1* | 2/2009 | Ireland | | 707/200 |
| 2009/0138526 A1* | 5/2009 | Linkert et al. | | 707/201 |
| 2009/0150569 A1 | 6/2009 | Kumar et al. | | 709/248 |
| 2009/0201908 A1 | 8/2009 | Gidron et al. | | 370/350 |
| 2009/0203402 A1 | 8/2009 | Aftab et al. | | 455/557 |
| 2009/0210454 A1 | 8/2009 | Sagar et al. | | 707/201 |
| 2009/0247134 A1 | 10/2009 | Jeide et al. | | 455/414.2 |
| 2009/0282125 A1* | 11/2009 | Jeide et al. | | 709/217 |
| 2011/0196826 A1 | 8/2011 | Retief et al. | | 707/621 |

OTHER PUBLICATIONS

Wikipedia contributors. "Exchange ActiveSync." Wikipedia, The Free Encyclopedia, Feb. 1, 2012. Web. Feb. 10, 2012.

* cited by examiner

1. DELETEphone list is formed by parsing XML from the Web. (Will also test if Service can be accessed BEFORE taking the time to scan the phone)
2. Records are deleted from phone.
3. FSCL is created by iterating over records on the phone.
4. FSCL and oldFSCL-DELETEphone are compared to detect deletions on phone which creates the DELETEqueue
5. Records are deleted from Web
(At this point all the deletions are accounted for on both sides, so now we only have to consider files that are relevant. )
6. In leiu of a full GETcompare from the Web, in some cases we can just substitute the oldFSCL for the GETcompare
  6a. If oldFSCL doesn't exist: GETcompare = XML from the Web.
  6b. If oldFSCL exists: GETcompare = oldFSCL - DELETEqueue.
  6c. If oldFSCL exists, but it's only partial since different Settings were choosen last time: GETcompare = oldFSCL + type specific GETcompare of the missing types.
7. If GETcompare = oldFSCL then also perform a NEWcompare which returns recently undeleted items. (Not yet implemented)
8. FSCL is compared to the GETcompare and items are moved to the GETqueue or POSTqueue if applicable. (Ignore any record types that aren't currently selected in Settings)
9. GETqueue-failed_GETqueue+FSCL is then saved to a file for use as "oldFSCL" next time.
10. Finally, the GETqueue and POSTqueue are processed, performing their respective functions.

Fig. 3

MOBILE COMMUNICATION DEVICE USER CONTENT SYNCHRONIZATION WITH CENTRAL WEB-BASED RECORDS AND INFORMATION SHARING SYSTEM

FIELD OF THE INVENTION

The present application is in the field of user content management and synchronization for mobile communication devices, such as cellular telephone devices, and other devices with user records maintained at a central node, such as at a web server.

BACKGROUND OF THE INVENTION

The immense popularity of mobile communication devices, such as cellular telephones and other hand held communication devices, has resulted in ever-increasing quantities and types of data that are being stored on the mobile communication devices. Therefore, such data becomes more important for the user and thus the updating and safety of such data is more important than ever. The same is true for photo data, video files and other user content stored.

Services such as ActiveSync, are available for mass storing of certain types of user data stored on such communication devices. However, such services do not allow on-line and off-line management of individual fields of user data by the user and from a second device. They do not provide granularity of data field management for the user. Further, existing services do not provide for automatic transporting of the data stored on-line to a different mobile device, for example, if the original mobile device is lost or damaged or if two or more users wish to share certain types of content.

Also, they do not provide for automatic two-way synchronization by updating the central node, such as a web server providing access to the user data, with any additions or changes to the data stored on the mobile device, while also updating the mobile device with any changes or additions to the on-line data.

SUMMARY OF THE INVENTION

A method, a system, a program of instructions embodied on a processor-readable storage medium, a set of signals implementing such a method, and a device that includes a module for carrying out such a method are described to enable a mobile communication terminal or another device that stores data for the user to automatically synchronize user content stored on a mobile device with user content stored at a central node, such as at a synchronization server. In this way, automatic two-way synchronization may be provided, the user may monitor, view, update, change, add to or delete all or any field of user content using a web interface provided for the device at a central node such as at a synchronization server cloud or data storage cloud, and may monitor the central node user content on-line or off-line from a remote device other than the mobile device.

Also, since the mobile device initiates most of the commands and thus most of the processing necessary to conduct a synchronization operation, the central node is relieved and the distributed system is obtainable. Accordingly, the central node, such as the synchronization server is required to perform a reduced quantity of processing and less demand is placed on the server cloud.

According to an embodiment of the synchronization operation, the synchronization application maintains a running log or list of every field of user content, and optionally the content of all such fields, that have been changed, deleted or added since the most recent synchronization application. Similarly, the central synchronization application of the synchronization server maintains such a running list for the user content stored by the central node that are changed, added or deleted since the most recent synchronization operation. Then, during the next synchronization operation corresponding fields of the list maintained by the synchronization application running on the device and the list maintained by the central synchronization at the central node are determined and the most recently updated field of each pair is used to update the user data that was less recently updated. These lists may also include a date/time stamp for each field that was changed as well as a hash, which represents the data's unique qualities. Alternatively, the lists may refer or index the user content records but not actually contain their user data that has been changed, deleted or added.

Further, if the mobile device is lost or is damaged, the central node would still have a record of all the user content as of the most recent synchronization operation and any replacement mobile device obtained by the user may be conveniently and automatically updated with the synchronization operation at the next timing (or at the user's initiation of the synchronization operation).

Other features and advantages of the present invention will become apparent from the following description of the invention which refers to the accompanying Drawings.

BRIEF DESCRIPTION OF THE DRAWINGS

FIG. 3 is an example of a set of operations for implementing a synchronization operation according to an aspect of Applicant's invention illustrated FIGS. 2A-C.

With reference to the Drawings, the features thereof are described below.

DETAILED DESCRIPTION OF EMBODIMENTS OF THE INVENTION

Figure 1:
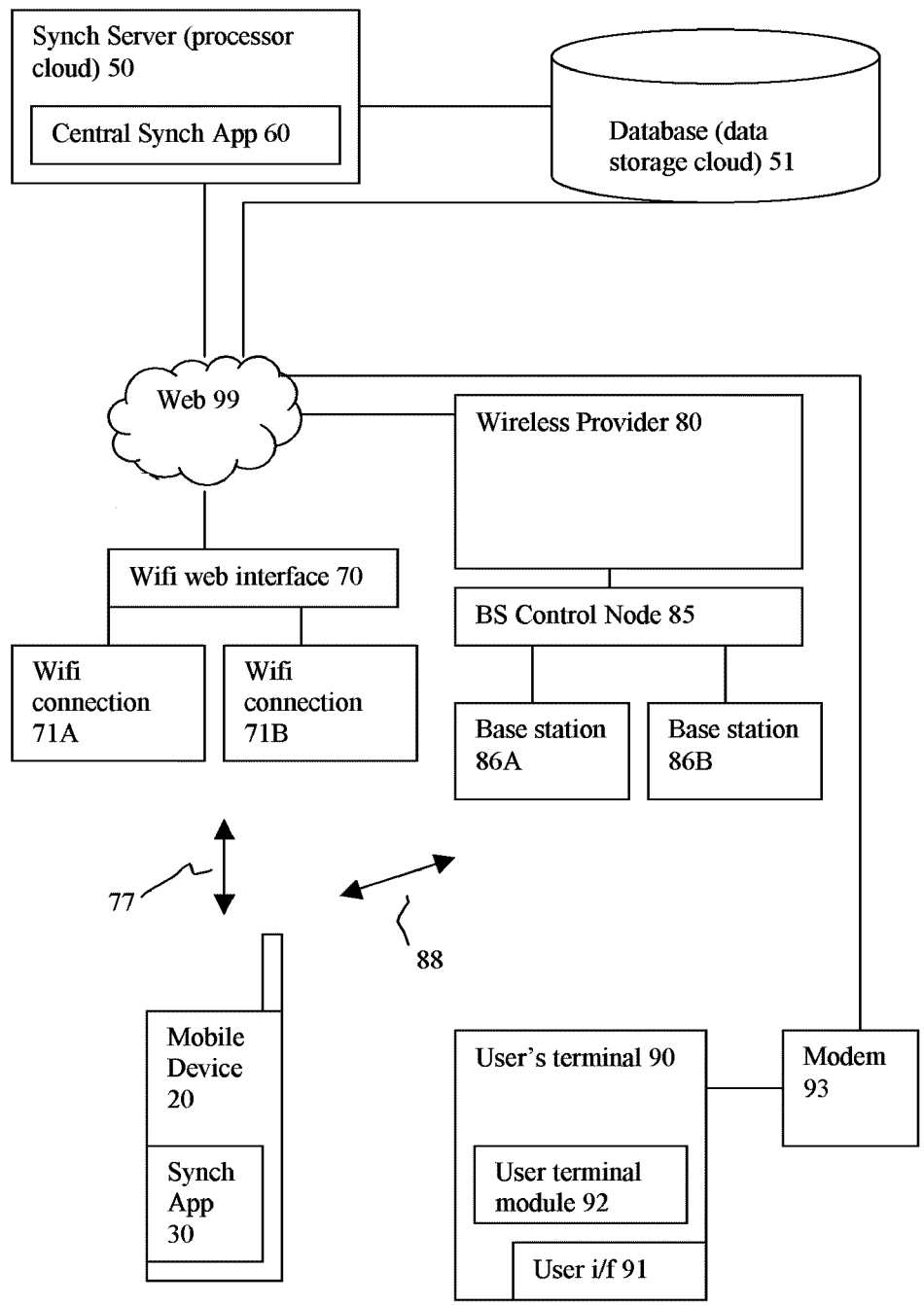
FIG. 1 is a schematic overview of a system according to an aspect of Applicant's invention illustrating the context of a mobile device with the synchronization application.

As illustrated in FIG. 1, a synchronization application 30 may reside on a mobile device 20, such as a cellular phone or a handheld keyboard device, or another type of portable communication device. The synchronization application may be implemented as software that comes prepackaged with the operating system and other software units of the mobile telephone from a cellular network provider or may be sold or downloaded separately. Also, the software may be sold as a package or downloaded from a specialty vendor that sells such software applications. Also, while the present application repeatedly refers to the synchronization application as software, the synchronization application may be implemented as hardware that is part of the telephone or device, as firmware embodied on a card sold together with or separate from the mobile device, or the like.

Figure 2A:
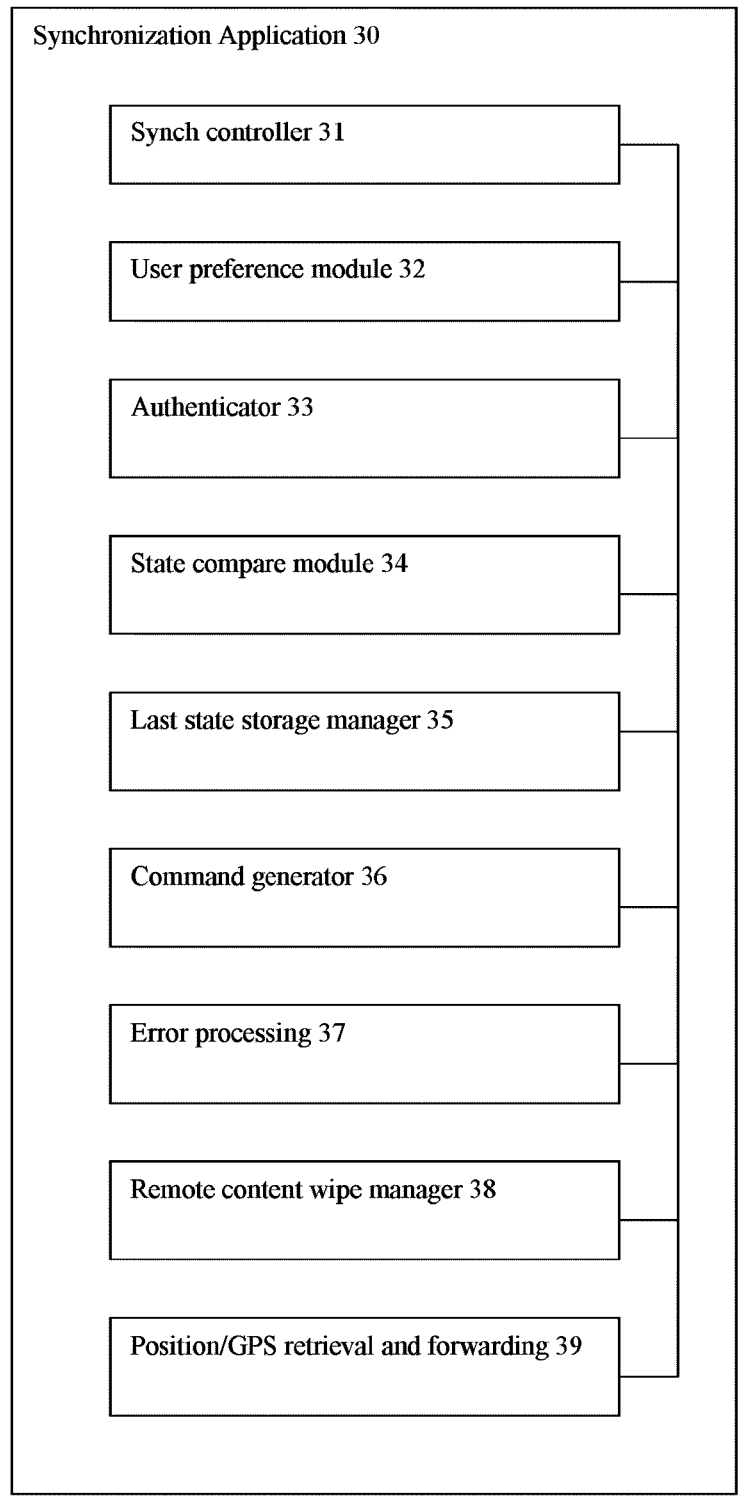
FIG. 2A-C illustrates components of the synchronization module at the mobile device, at the user device and at the central node, respectively, according to an aspect of Applicant's invention.

As illustrated in FIG. 2A, the synchronization application 30 includes a synchronization controller 31 that activates a synchronization operation upon the occurrence of a certain event, upon the initiation by a user (not shown), or upon the elapse of a predetermined time period. For example, the user may wish to initiate a synchronization operation when he has purchased a new mobile device and wishes to update his or her current device with the information from his/her previous one. Alternatively, the synchronization controller 31 may automatically initiate the synchronization operation at a certain time everyday, every week or at some other regularly occurring time period. Further, the user of the mobile device 20 may also be allowed to determine the times or the regularity occurring periods at which a synchronization application is to be performed.

Such user content to be synchronized may include some or all of the user content that is stored for the user on the mobile device 20. For example, such user content may include the user's contacts or "address book" or "telephone book" stored by the user, including the names and telephone numbers of the user's friends and acquaintances, the user's calendar events, the user's alarm clock settings, the user's text messages and e-mail messages, including outgoing, incoming, archived, deleted and draft, the user's voicemails, the user's recorded greeting or outgoing messages, the user's notes, the user's photos, the user's videos, the user's ringtones, the user's saved links and URLs, the user's preferences and any other such information that the user may store.

The synchronization application 30 may provide for a two-way synchronization of the user content data, such that any changes, automatic updates, additions or deletions made to the user content data stored on the mobile device 20 are automatically updated to a central node illustrated in FIG. 1 as a synchronization server 50, and such that any changes, automatic updates, additions or deletions made to the user content data for that user at the synchronization server 50 are automatically updated to the contents of the mobile device 20. The user of the synchronization application may have access to the synchronization server at the central node, for example, via a website provided by a vendor that provides the synchronization service or via a website of the wireless network carrier or cellular provider 80, and thus, according to this aspect of Applicant's invention, the user would be able to monitor, view, change, delete or add to any portion of the user content data stored for the user for the mobile device 20 at the synchronization server 50 via the website. Thereafter, during each synchronization operation, the synchronization application 30 residing at the mobile device 20 would automatically provide the two-way synchronization of the user content data stored at the mobile device 20 with the user data stored at the synchronization server 50 and/or the database 51 at the central node.

According to an aspect of Applicant's invention, to overcome a potentially difficult hurdle regarding data ambiguity, the synchronization operation would entail giving preference to any data stored at the mobile device 20, which would be assumed to be more recent than the data for the user stored at the synchronization server 50 and/or at the database 51 of the central node, or, according to another implementation, in case of conflict as to which update is more recent, the content stored at the mobile device 20 would be given preference. Alternatively, at each synchronization operation, the synchronization application 30 would determine which of the data stored at the mobile device 20 at the synchronization server 50 is more recent, and in particular would determine for every field of data or every particular record of the user content the more recent one, and would use the more recent field as the basis for updating the less recent corresponding field or record for the user, without giving preference to information stored on the mobile device 20.

As illustrated in FIG. 1, the synchronization application 30 may provide the synchronization operation by communicating with the synchronization server 50 via wireless connection 88 with a base station 86a or 86b, whichever is determined to be the controlling cell for the mobile device 20, of a wireless cellular network which further may include BS control node 85 for controlling the base stations, and the wireless provider facility 80 for providing a web interface for the cellular network to connect with the internet, such as the world wide web 99 and the synchronization server 50. Alternatively, or in addition to the foregoing structures, the mobile device 20 may include a Wi-Fi connection card or other type of Wi-Fi connection port (not shown) to communicate via Wi-Fi wireless link 77 with Wi-Fi connection 71a or Wi-Fi connection 71b which in turn connects with the Wi-Fi web interface 70 to connect with the synchronization server 50 via the web 99. A mobile device 20 may have one or more network interfaces, for example, one or more network interface cards (NIC) or a network controller, and the network interface may include a personal area network (PAN) interface providing bluetooth, UWB (ultrawideband network) or IEEE 802.15.4 (for example ZigBee) functionality. For example, mobile device 20 may be in wireless communication using bluetooth or ZigBee with a local device that is in turn in communication with the central node via web 99.

Figure 2B:
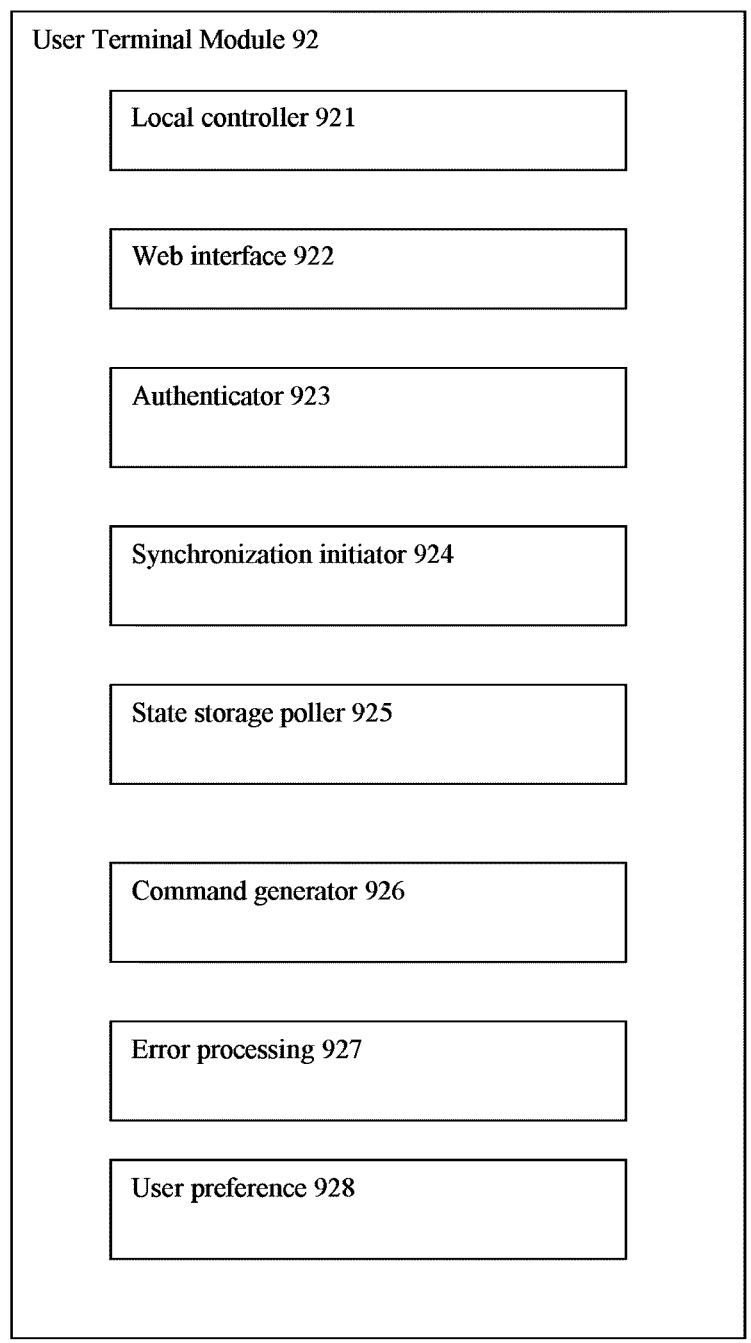
Figure 2C:
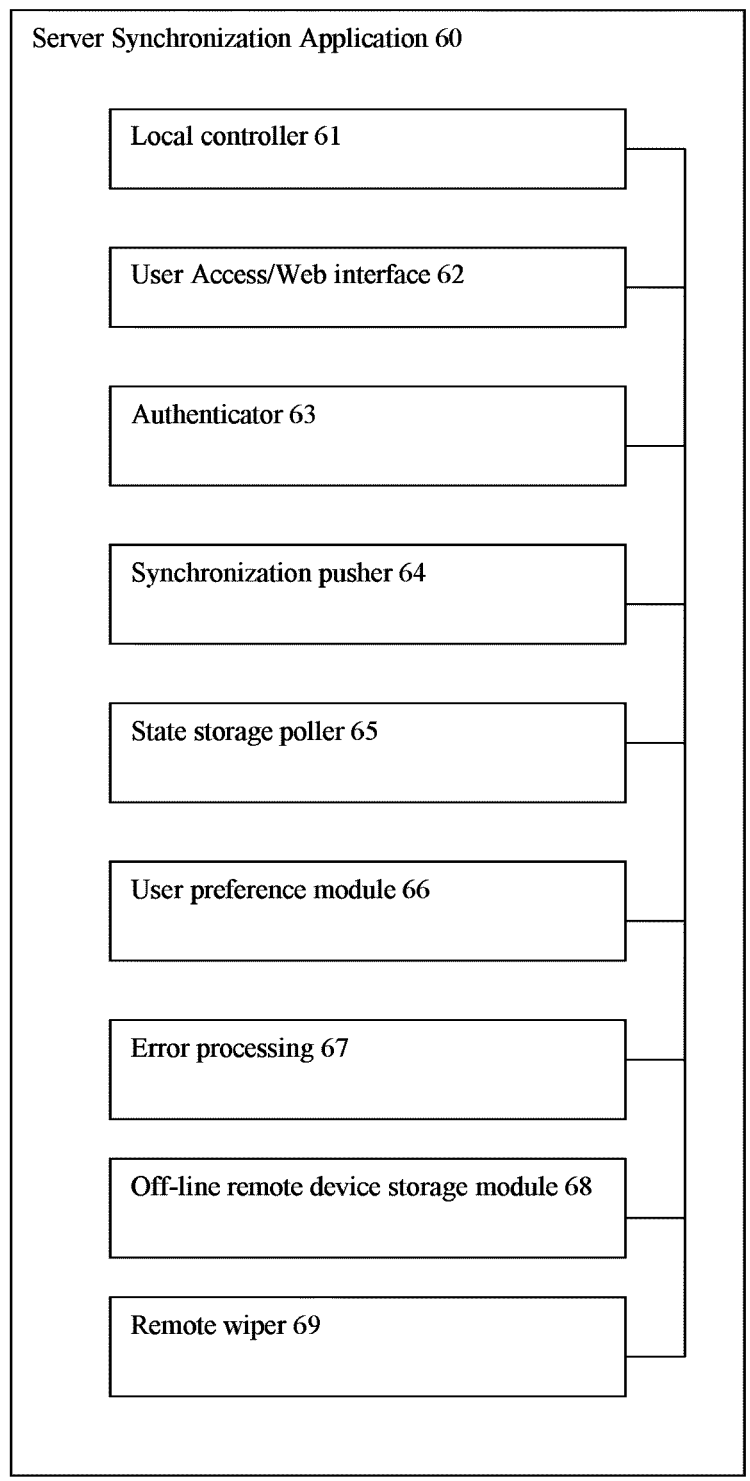

The synchronization server 50 may be implemented as a processor cloud that includes a series of processors and may include a synchronization application 60 that provides functionality for synchronization at the central node, components of which are shown in FIG. 2C. The synchronization server 50 may also be attached to a database 51, which too may be implemented as a data storage cloud, or a set of servers connected to the web 99. The synchronization server 50 or processor cloud may be connected to the database 51 (or to data storage cloud) directly or via web 99.

Figure 4:
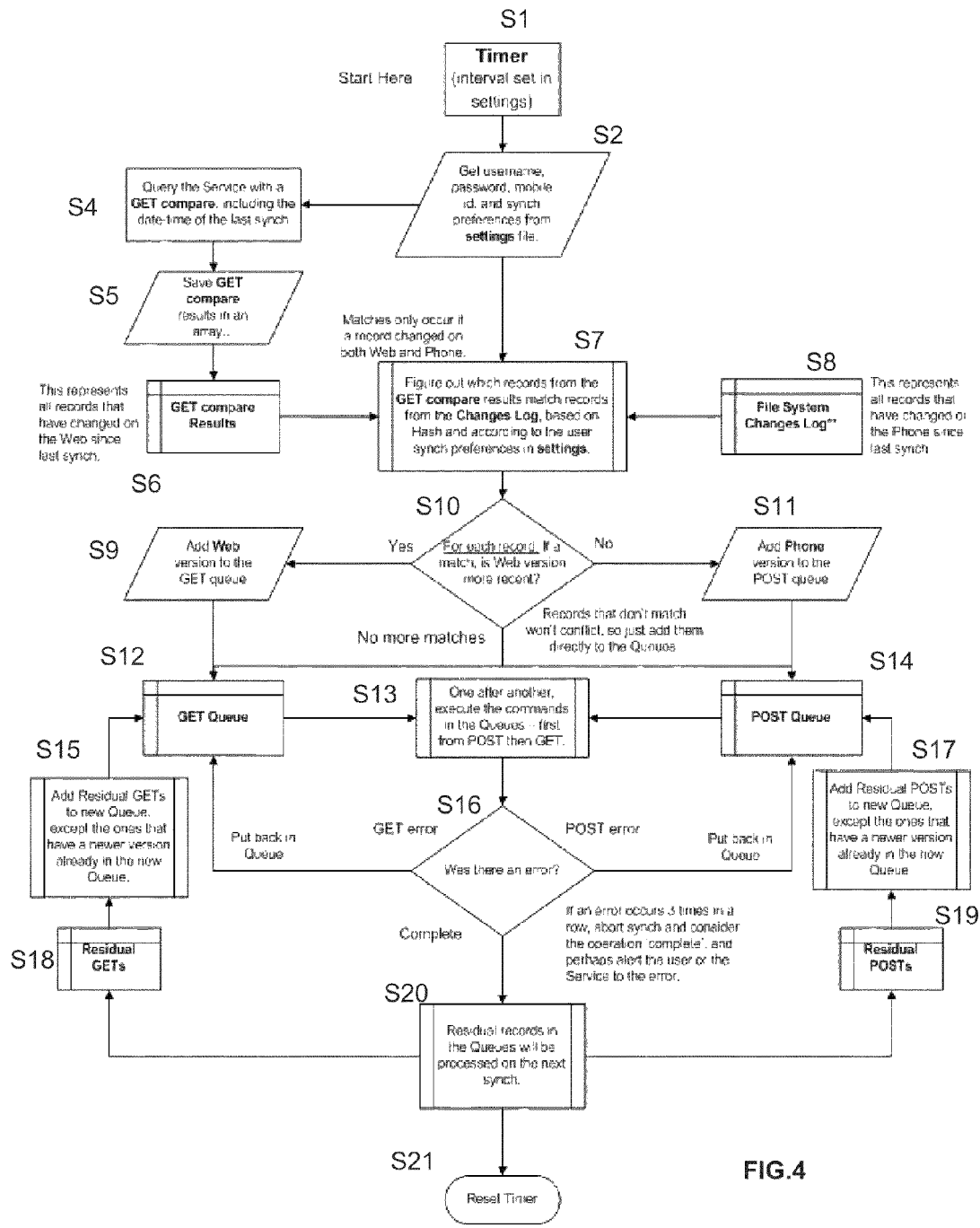
FIG. 4 is a flow chart illustrating an example of steps that may implement the synchronization operation according to an aspect of Applicant's invention.

FIG. 3 illustrates an example of steps of a synchronization operation, and FIG. 4 is a flowchart illustrating an example of a synchronization operation according to an aspect of Applicant's invention.

Figure 10:
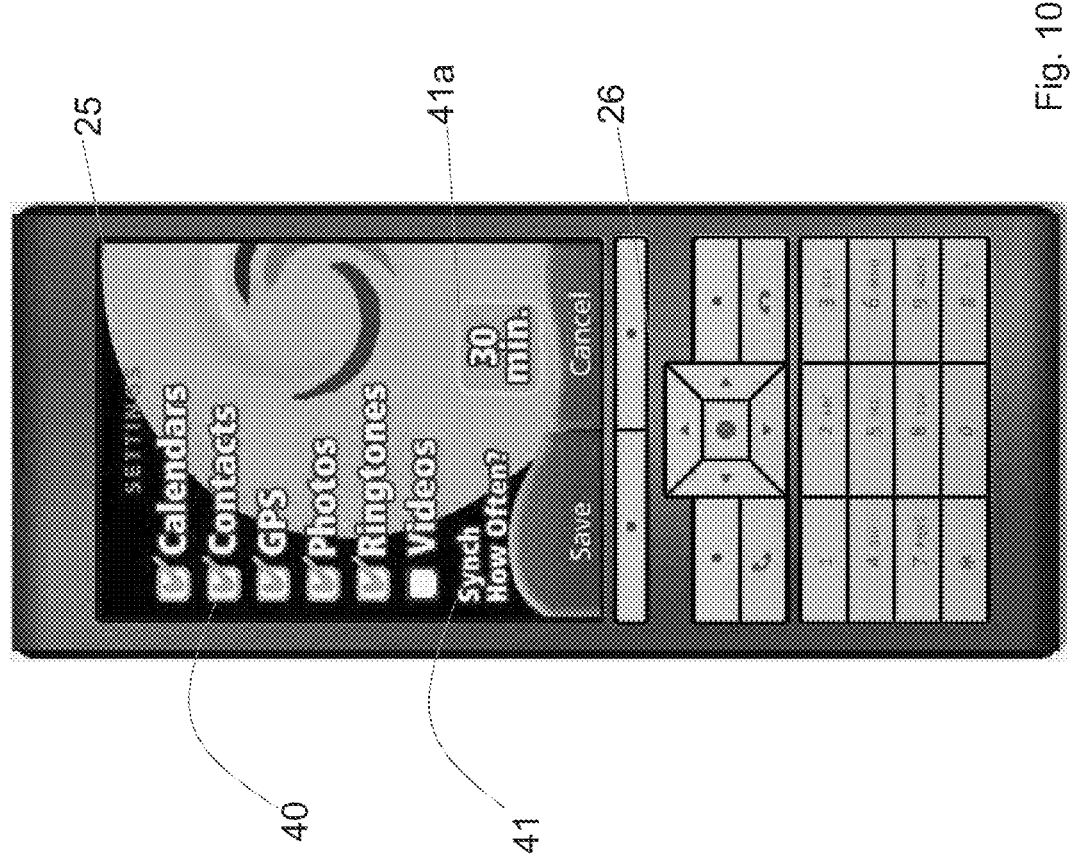

A synchronization operation may be performed, for example, at a certain time every hour or once a day. Further, the user may be allowed to specify via user preference module 32 of the synchronization application 30 at what time or how often such synchronization operations are to be initiated. For example, as illustrated in FIG. 10 the user interface provided by the mobile device 20 may include a set of boxes or "radio buttons" or the like to designate the times or events for commencing of synchronization operations. The selections may be stored in the user preference module 32 of the synchronization application 30. Similarly, the user interface provided by the mobile device 20 may allow the user to designate using a selection of boxes or radio buttons or the like what types of user data to synchronize. The user may wish to synchronize only contact list/telephone book type information and items on the calendar, but not such items as the alarm clock function settings. The user interface may also provide default settings that are checked automatically until or unless the user changes them. These settings may then be stored in the user preference module 32 of the synchronization application 30. Mobile device 20 may include a display, such as an LCD, LED or an organic light emitting diode (OLED) based display, or a CRT display or some such other type of display.

FIG. 10 illustrates graphical user interface provided on a monitor 25 of the mobile device 20. In response to the prompt "Synch How Often?", the user may use the arrow buttons 26 or other keys of the mobile device 20 to designate the frequency with which the synchronization operation is to be commenced. For example, as illustrated in FIG. 10, the display provides an indication 41A of the current frequency of synchronization. Further, using the graphical interface 40 the user may input what types of user content are to be synchronized with the central node user content during the synchronization operation. For example, as illustrated in FIG. 10, the user may include for synchronization, such types of user content as calendars, that is events, reminders, or other settings saved in the calendar feature of the mobile device 20; contacts, that is names, telephone numbers, e-mail addresses, and other information associated with entries of the telephone book feature of the mobile device 20; GPS information, that is to provide a running log of the position of the mobile device 20 to the central node; photos, that is photographic images, or other types of graphic information stored at the mobile device 20; ringtones; and/or videos stored at the mobile device 20.

As illustrated in FIG. 2A, synchronization control 31 initiates remaining components of the synchronization application 30 at a predetermined time or upon the occurrence of a predetermined event. Synchronization control 31 attempts to contact the synchronization server 50 via the wireless network and the base station 86a or 86b or via the Wi-Fi connection 71a, 71b and the Wi-Fi interface 70. Communication between the synchronization application 30 of the mobile device 20 and the central synchronization application 60 at the synchronization server 50 may be conducted using a standard TCP/IP implemented as part of a packet-based network and may use standard HTTP in a RESTful paradigm.

Figure 9:
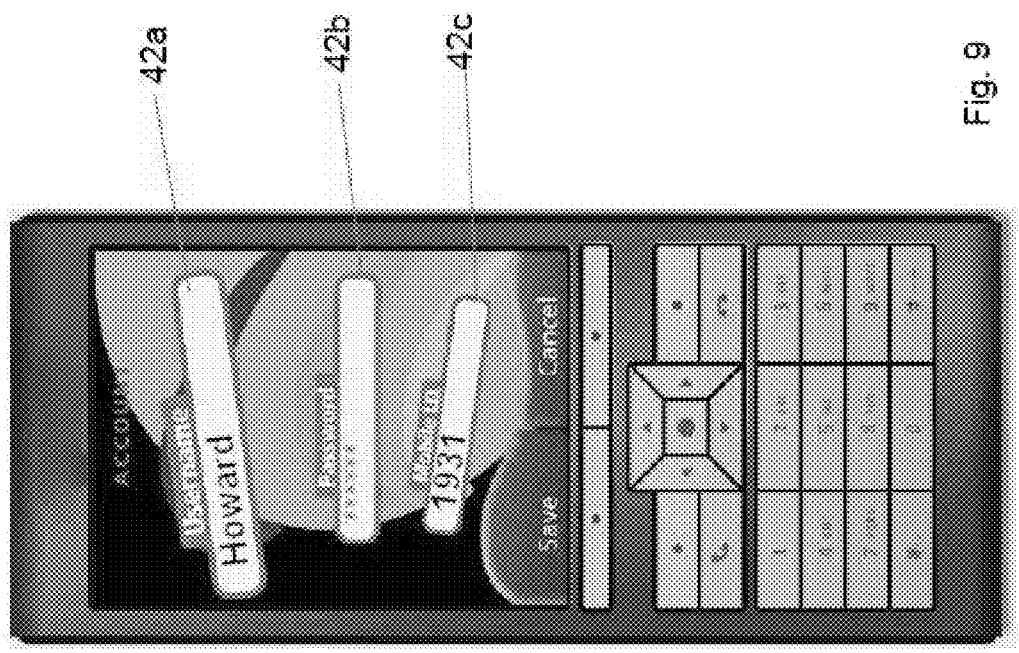
FIGS. 9 and 10 illustrate features of the graphical user interface that may be provided for the mobile device 20, according to an aspect of Applicant's invention.

As illustrated in FIG. 9, when setting up the mobile device 20 for synchronization with the central node the user may be prompted to enter a user name and password and to enter a mobile ID identifying this mobile device 20 for the user. Thus, the user may associate many mobile devices for synchronization with the central node and each mobile device will share the same user name and password for the convenience of the user. In the alternative, for added security as illustrated in FIG. 9 the user may be asked to provide the user name and/or the password associated with the user name and/or the mobile ID in addition to the user name and password each time the synchronization operation is to be commenced. The mobile device 20 may be assigned a unique ID, or, the subscribing user may be assigned a unique ID and the mobile device 20 may be assigned a secondary device ID, for example device ID 1-99, associated with the unique ID of the mobile user. An authentication of the mobile device 20 is performed by authenticator 33 which ensures that the mobile device 20 is a subscriber of the service provided by the synchronization server 50. For example, a public key and private key approach may be used for authenticating the mobile device 20 by authenticator 33. Other authentication schemes are well known and may be used in addition to or instead of the one described. Although the synchronization server 50 is shown as a unit distinct from the wireless provider 80, according to an aspect of Applicant's invention, the wireless carrier or network provider may provide the synchronization service and may thus house or provide the synchronization server 50.

FIG. 4 is a flowchart illustrating an example of a series of steps performed as part of a synchronization operation according to an aspect of Applicant's invention. At S1 a timer indicates that a certain time has elapsed or a particular time of the hour or the day that has been predetermined to be the synchronization time has been reached and a synchronization operation is begun at S2. As an alternative to initiation of the synchronization operation commenced by the synchronization application 30 residing in the mobile device 20, or in addition to the times of synchronization operation initiated by the synchronization application 30, according to an aspect of Applicant's disclosure the central synchronization application 60 residing at the synchronization server 50 may also commence in the synchronization operation. Accordingly, the central synchronization application 60 of the synchronization server 50 would signal the synchronization controller 31 or the synchronization application 30 to commence the synchronization operation. The subscriber's user name, password and the ID of the mobile device are obtained from memory of the mobile device 20 for authenticating the mobile device 20 by the synchronization server 50. In addition to or instead of offering a password from a memory of the mobile device, the user may be asked to provide a password. Further, synchronization preferences provided by the user and stored by the user preference module 32 may also be obtained to control what fields of data are to be synchronized. For example, the user may wish to synchronize only certain fields of data of the user content but not other fields. The user preference profile may provide a default setting in which all user content stored is automatically synchronized unless the user chooses a different setting.

At step 54 the central node is requested to provide all fields of the user data that have been changed since the most recent synchronization operation and the data/time of the most recent change or update of each field that has been changed. The GETcompare may be a method call requesting a list of all records maintained associated with the requesting mobile 20 device of the user at the central node that have been changed, added or deleted since the most recent synchronization operation. Other terms used in FIG. 4 include FSCL, the File System Changes Log, which is a representation of all the user records of interest on the mobile device 20. oldFSCL is a list of all records on the mobile device 20 as they existed before the current synchronization operation. Thus, since most devices do not keep a list of recently deleted files, the FSCL file is compared with the oldFSCL file to determine which file or files needs to be deleted by adding it to the DELETEqueue. Thus, the DELETEqueue is a list of records to be deleted from the central node, as determined by comparing the oldFSCL with the FSCL. Similarly, DELETEphone is a list of all records that are recently deleted on the central node. They are deleted via a DELETE command. The GETqueue is a list of records that are to be retrieved from the central node. Then, FSCL is compared with the GETcompare/oldFSCL. The POSTqueue, on the other hand, is a list of records to be posted using the POSTcommand to the central node. This list is determined by comparing the FSCL with the GETcompare/oldFSCL. Alternatively, all user content data from the central node may be requested and stored temporarily by the mobile terminal.

At S5 the fields that have been changed may be stored temporarily by the synchronization application 30 in the mobile device 20. Similarly, at F8 a File System Changes Log is generated or read out. This log represents all fields of the user content stored on the mobile device 20 that have changed since the most recent synchronization operation.

Such a File Systems Changes Log may be generated in several ways, for example, a background process may be running that adds each file system change in the mobile device to the log, or at run time during the synchronization operation (or just before the synchronization operation) the files may be scanned and those fields that have changed since the most synchronization operation may be added to the log. The latter approach may be more applicable for the first synchronization operation and would be less susceptible to a changed field if the program had been turned off.

At S7 the corresponding fields of the records obtained from the central node and the file system changes log are determined. Such corresponding fields of the user record may be obtained, for example, if each field of user content is indexed by a searchable key. Then, at S10, for each corresponding record a determination is made as to which version, the version that had been maintained by the central node or the version that had been maintained by the mobile device 20 is the most recent version. This determination is made based on the date/time stamp associated with each field of the user data of the GETcompare results and the File System Changes Log. If at S10 the version maintained at the synchronization 50 is determined to be more recent then a command is generated and added to a command queue to update content stored by the mobile device 20. Alternatively, if the mobile device 20 version (the "phone version") is determined to be more recent for that field of the user data content, then a command is generated and added to the command queue to request that the synchronization server 50 update the data stored at the central node, including by the database or the data storage cloud 51 (S11).

As shown in S13 the commands on the command queue are executed one after another. As shown in the flowchart of FIG. 4, two command queues may be generated, one at S12 containing the GET commands for obtaining data of the central node and updating the mobile device 20 user content, and one at S14 containing the POST commands for updating the central node user content. At S16 a determination is made as to whether there was an error. If a GET error was made then the command is reposted to the GETqueue and if a POST error is made then the command is put back on the POSTqueue S14. It will be understood that while described using method calls of one computer language, many other types of command syntax are possible. Also, while the synchronization operation is described with reference to the approach illustrated in FIG. 4, it will be readily understood that many other types of synchronization operation are known that will make possible the update of a field of user data that has been changed by a user, in order to automatically update with new information that has been added, or to remove data has been deleted, to a less recent corresponding field.

Figure 5:
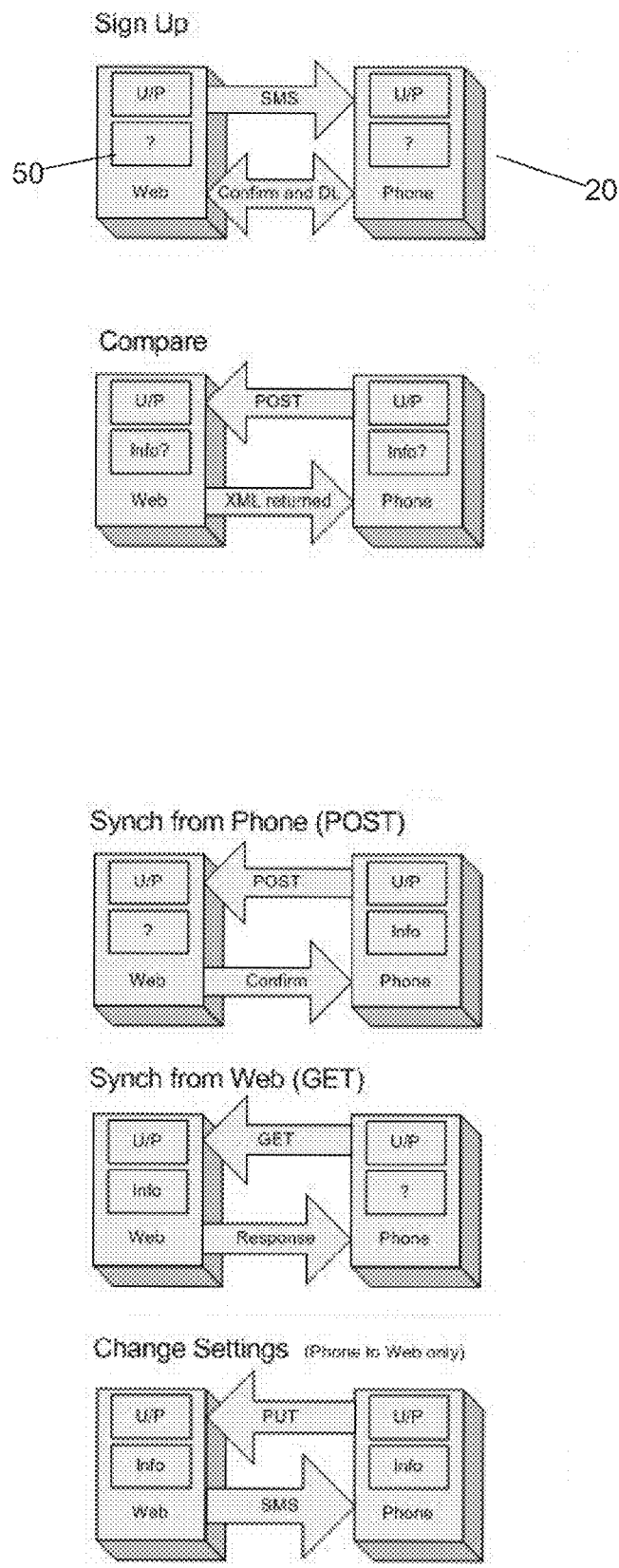
FIG. 5 illustrates communication between the mobile device and the central node for authentication and for the synchronization operation according to an aspect of Applicant's invention.

At S20 commands effecting residual records are added to queues of residual commands, a residual get queue is generated at S18 and a residual post queue is generated at S19 and these command queues are added to respective command queues performed at the next synchronization operation, except that if a field effected by such residual command is more subsequently updated after the current synchronization operation then residual commands are not executed. At S21 the timer for starting the next synchronization operation is reset, such that, for example if a synchronization operation is set to be commenced every hour than the timer is set for an hour starting from the completion of the current synchronization operation. According to an aspect of Applicant's invention, the user preference module 132 may provide an automatic default setting for a timing of synchronization operations, and the user preference module 132 may have a minimum threshold, for example five minutes, that must elapse between synchronization operations. Also, a thirty minute or an hour minimum interval setting may be provided as the minimum time that may be set by the user by the user preference module 132. FIG. 3 illustrates a list of operations performed by the synchronization application 30 as part of a synchronization operation written out as pseudo code. FIG. 5 is a high-level illustration of the authentication stage and the synchronization operation according to an aspect of Applicant's invention, performed with command issued by the synchronization application 30 residing on the mobile device 20.

A basic outline of steps executed during a synchronization operation is illustrated in FIG. 5. At "Sign Up" an SMS (short message service message) or other such communication may be sent to the mobile communication device 20 (phone) with a link to install the application. At "Compare" the Phone sends a command to the central node (Web), which replies with XML data required to synchronize. At "Synch from Phone" the Phone passes data to the central node, with the central node-transmitting confirmation. At "Synch from Web" the Phone is requesting data from the central node. "Change Settings" is provided to update user account details from the Phone.

Figure 6:
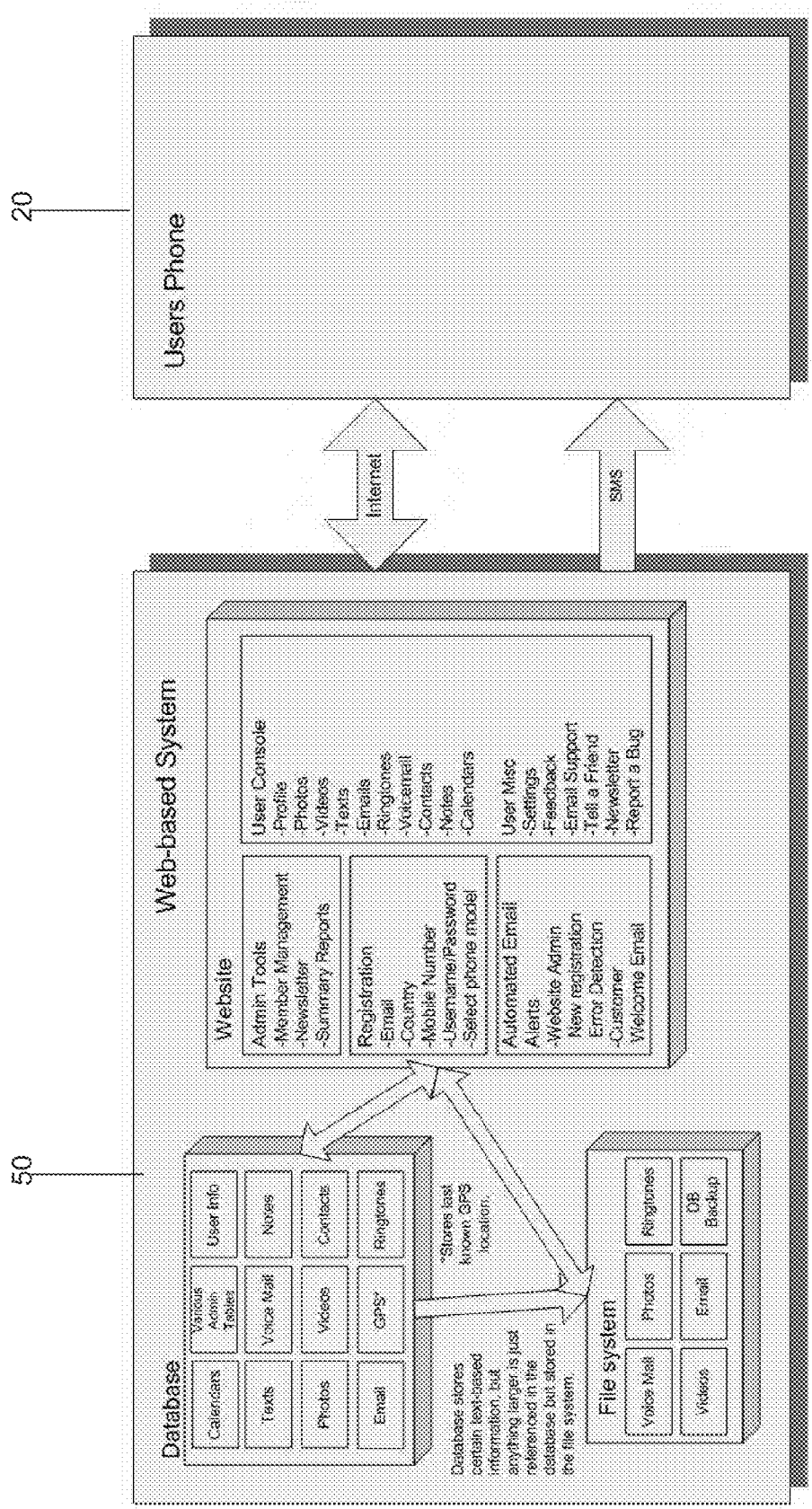
FIG. 6 illustrates records of the user data maintained by the central node according to an aspect of Applicant's invention.
Figure 7:
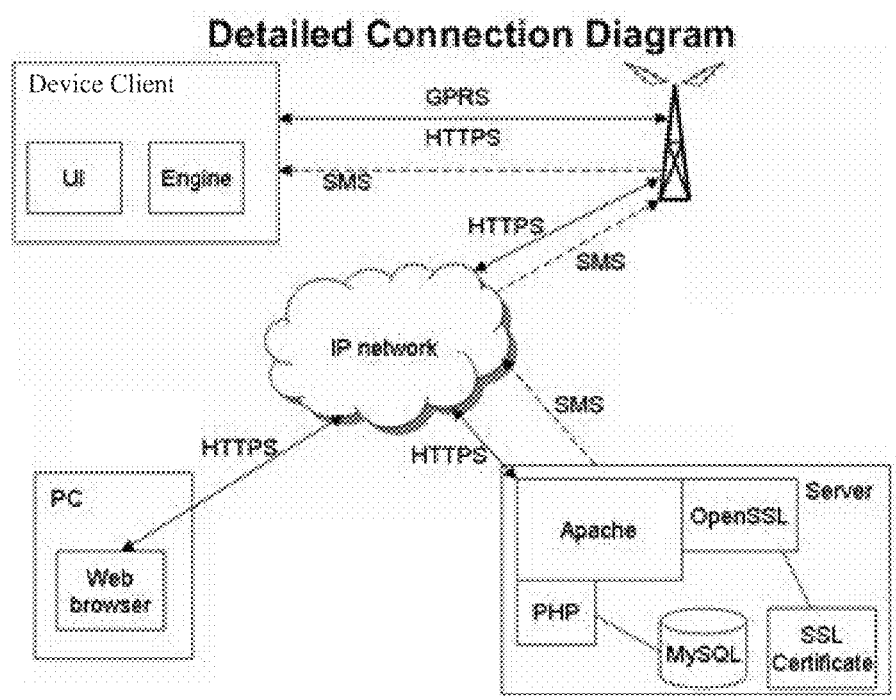
FIG. 7 is a detailed connection diagram showing an example of connections between a mobile device, personal computer, such as a desktop or a laptop, and a central server via the Internet.

FIG. 6 illustrates a scheme for organizing user content data at the central node (sometimes referred to as the web-based system) in relation to the mobile device 20 (sometimes referred to as the user's phone). FIG. 7 illustrates an example of a communication scheme between the client device and a central node server communicating via HTTPS via web 99, and also illustrates a PC terminal 90 that may be used by the subscriber to monitor data stored.

Also, according to another aspect of the invention, the central node may initiate the synchronization operation using "push" approach. Thus, the central synchronization application 60 of synchronization server 50 of the central node may transmit a request to the synchronization controller 31 of the synchronization application 30 of the mobile device 20 to commence synchronization operation. Such a push-based initiation may be provided at a particular time of the day, week or month, at predetermined time intervals or upon the occurrence of a previously specified event, such as the user signing onto an account via a web interface to the central node. Also, the central synchronization application 60 may include a user preference module 66 to request and store user selected time, time interval or specified occasions for initiating the synchronization operation. Such a push-based synchronization operation may also be initiated automatically for all devices when a second mobile device of the user or another terminal 90 is associated with the central node, or may be initiated manually as desired by the user. Such a push-based synchronization operation may be performed in addition to or in lieu of the synchronization operation initiated by the synchronization application 30 of the mobile device 20.

As illustrated in FIG. 1, another processing device of the user, such as the user's terminal 90, may be used to monitor or to manage user content. User may interface using user interface 91 with the user terminal 90, which may be connected via modem 93 to web 99 for communicating with the synchronization server 50, to allow user to view or to change user content via a web interface. Terminal 90 may be connected as part of a local area network (LAN) or WAN (wide area network) or using near field communication (NFC) or Bluetooth.

User terminal 90 may be a desktop computer, a laptop computer, a netbook, a television unit or other electrical appliance, a handheld device, tablet or other type of mobile terminal or device, or a mobile communication device such as another mobile telephone. According to an embodiment of the invention, the user's terminal 90 may also store off-line all or some of the user content for the mobile device 20 of the subscriber, and during each synchronization operation or following each synchronization operation between the mobile device 20 and the synchronization server 50, the user's desktop terminal 90 may also be updated and synchronized with the most recent version of the user content. Alternatively, the user's desktop terminal 90 may be synchronized each time the user's terminal 90 is turned on and connected to web 99 via modem 93.

Figure 11:
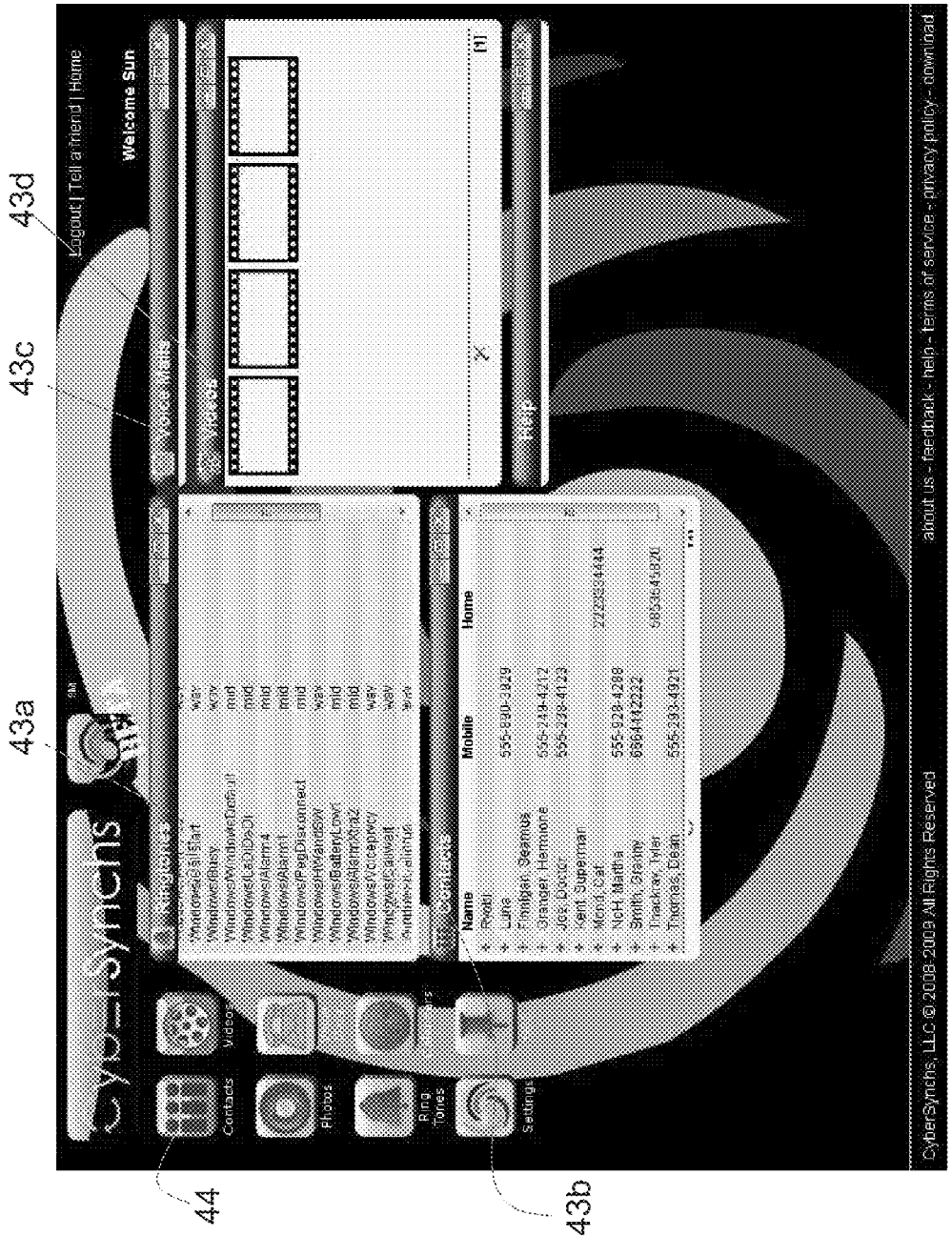
FIGS. 11-14 illustrate the features of the graphical user interface provided at the central node according to an aspect of Applicant's invention.

FIG. 11 illustrates a graphical user interface for interacting with the central synchronization application 160 at the synchronization server 50 at the central node. Thus, as shown in FIG. 11, the user may select one or more of many ringtones 43A for inclusion and playing at the mobile device 20. In addition, the user may manage the contacts 43B portion of the user information, including adding, deleting or modifying the names, mobile phone numbers, home phone numbers and other associated information for each contact. Similarly, the user may view, add, delete or change voicemails 43C and videos 43D maintained at the central node. Also as shown in FIG. 11, there is a list of icons 44 identifying the types of user information that may be viewed, managed, or updated at the central node for the mobile device 20. Such icons include contacts, shown as open at 43A, videos, shown as open at 43D, photos, voicemails, shown as open at 43C, ringtones, shown as open at 43A, calendars, other settings, and the GPS feature. The user may also interact with the interface using a stylus, a mouse, a track pad or other such input devices. Also contemplated is a voice command feature with which the user is able to transmit commands or queries, including commands to operate the user interface and to initiate synchronization operations. Also, the user interface may provide voice information or voice prompts to the user. Such voice commands and voice interactivity may be provided at either or both the mobile device 20 or at the user terminal 90 or at other additional devices with which the user interacts with the central node.

Figure 12:
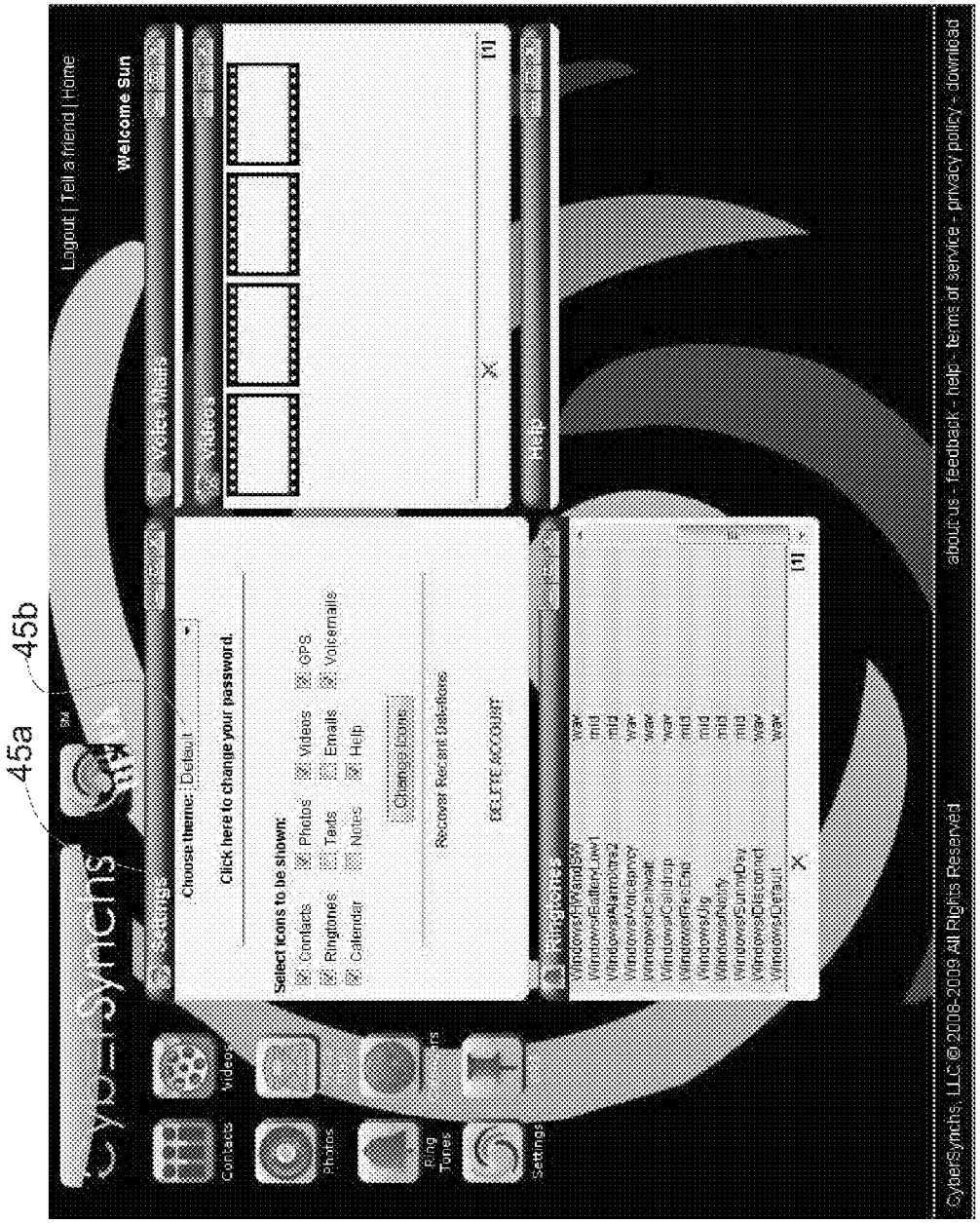
Figure 13:
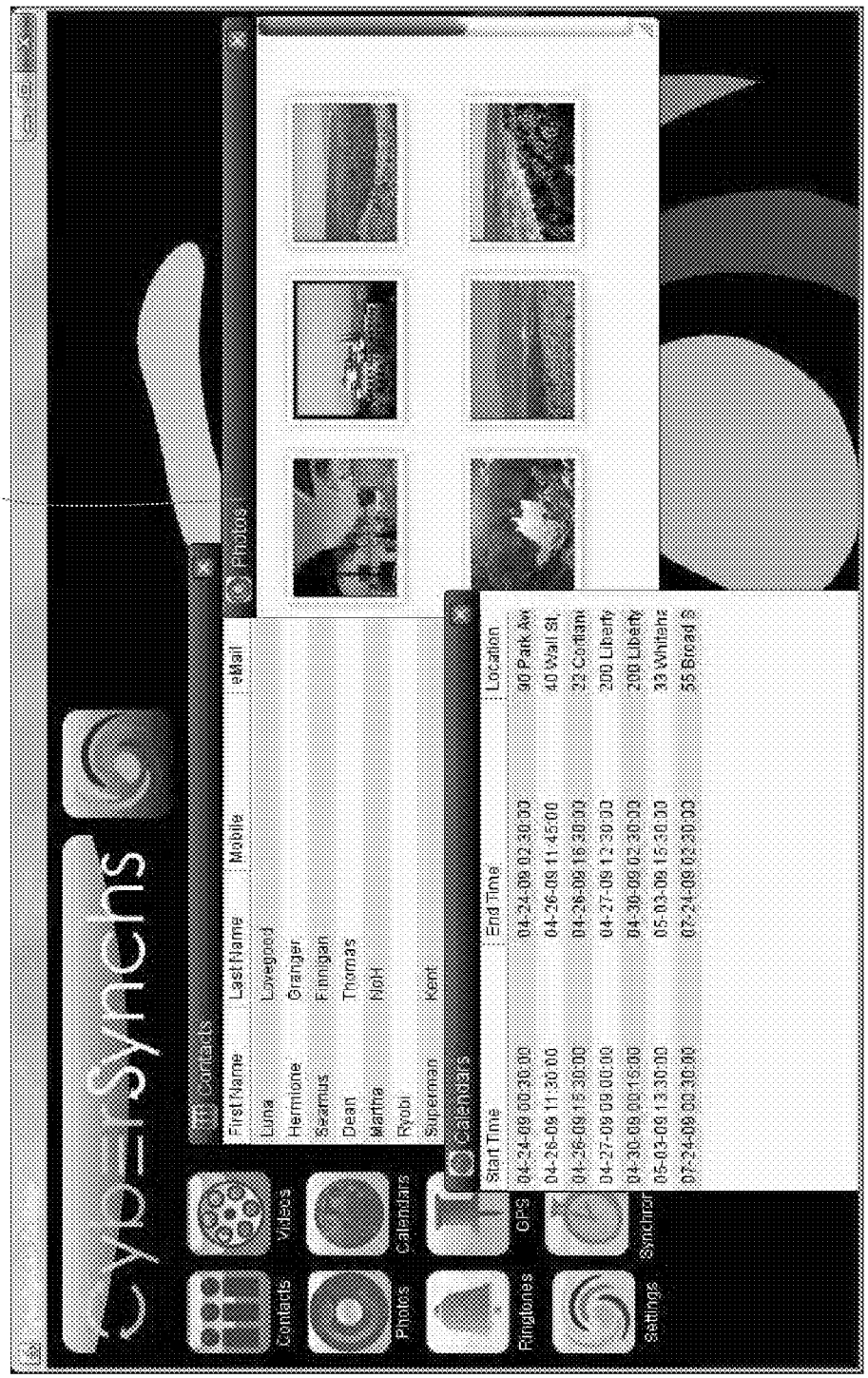
Figure 14:
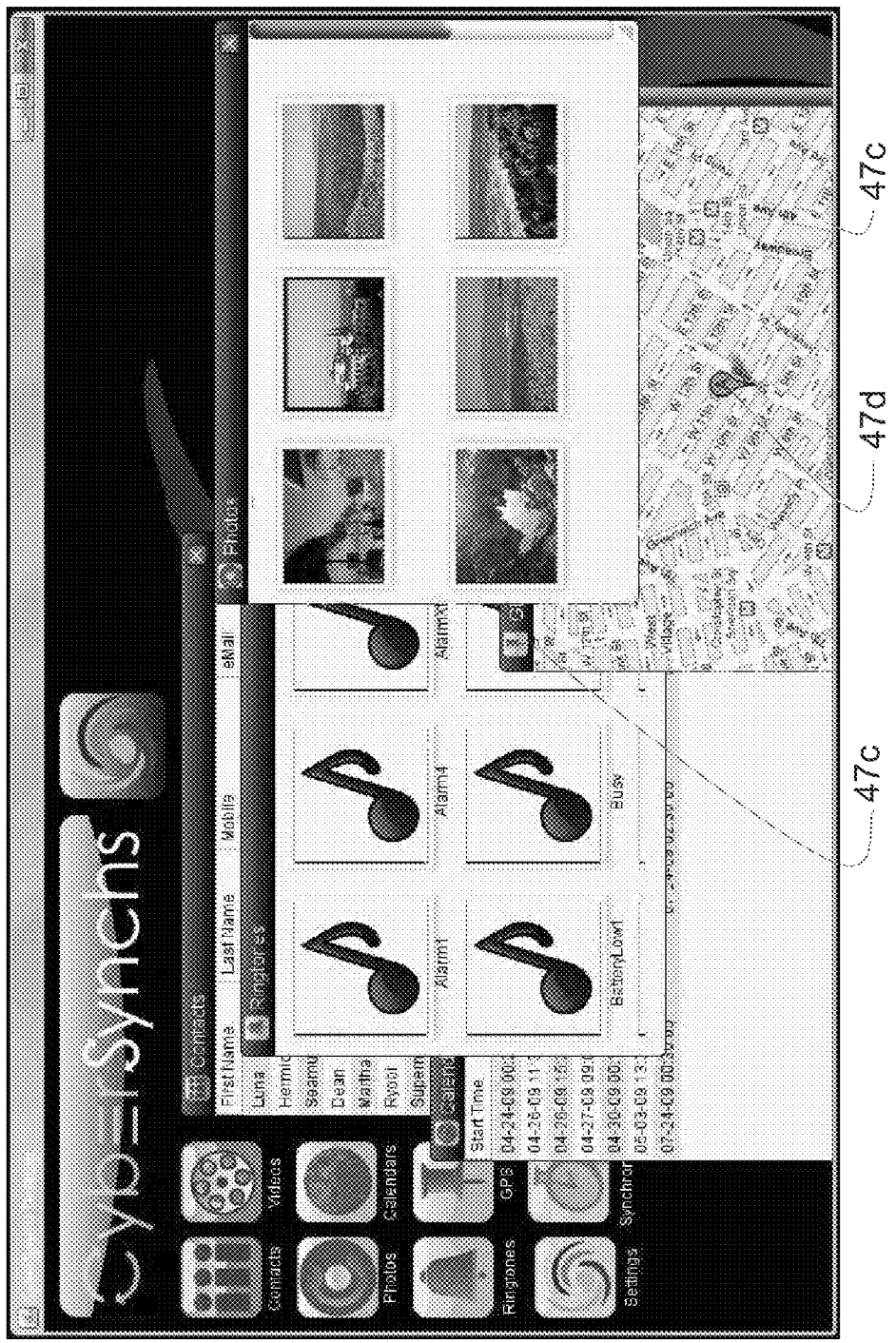

FIG. 12 illustrates the settings feature 45A as being open, and allows the user to manage the graphical user interface display provided to the user. Thus, as illustrated in FIG. 12, settings feature 45A allows the user to adjust which list of icons 44 are to be displayed, and also provides a default setting 45B, which by default will display a number of the icons of the list of icons 44 unless and until the user changes them. FIG. 13 shows the photos feature as having been opened and allows the user to view, and to manage, that is to add to, delete from, change, or edit the photos stored at the central node. Further, FIG. 14 illustrates the calendar feature 47A and the ringtones feature 47B as having being opened in order to allow the user to view and to manage these types of user content maintained at the central node. Also, as illustrated in FIG. 14 is a GPS mode 47C in an open state illustrating a position "A" 47B of the mobile device 20 mapped onto a street grid 47E of the GPS feature. FIGS. 11-14 illustrate a graphical user interface that may be provided at the central node. However, depending on terminal 90, such a graphical user interface may also be provided as user interface 91 at the user terminal 90. On the other hand, if terminal 90 is a handheld device that provides for only a small monitor or screen, than the user interface may be provided as user interface 40 shown in FIG. 10 for the mobile device 20.

In addition, or in the alternative, the user terminal 90 may have a second synchronization module 92 that initiates independently of synchronization application 30 a synchronization operation for synchronizing content stored on terminal 90 with content stored at synchronization server 50. Components of synchronization module 92 are shown in FIG. 2B. As discussed with reference to synchronization application 30, synchronization module 92, or portions thereof, may be provided as hardware, software, firmware or the like, or combinations of the foregoing. This independent synchronization operation may be commenced at regular intervals, or at previously designated times as discussed above.

According to an aspect of the invention the desktop terminal 90 may be used by a parent to monitor user content of the mobile device 20 of a minor and may allow the parent to change the user content stored on the mobile device 20 via the automatic synchronization operation described above or may change user settings for permissible user content, such as porn filters or other filters for user content. Thus, if the mobile device 20 is unavailable, the user may still change any fields of the user content for the mobile device by visiting the website managing the synchronization server 50.

A further operation that may be initiated by the user is a "data wipe" operation. The user may visit the synchronization server 50 via the web interface, for example, in case the mobile device 20 is lost or damaged, and initiate a request from the synchronization server 50 to the mobile device 20 to delete all user content stored by the mobile device 20. In this way, if the mobile device 20 is found by an unscrupulous party all data stored on the mobile device 20 would have been deleted. However, if the user obtains a replacement mobile device 20, the data stored at the central node can be updated to the replacement mobile device without burdening the user with having to replace the data manually.

According to another aspect of Applicant's invention, the user may track a location of the mobile device 20 via the user's terminal 90 because at every synchronization operation, or other predetermined times, the location of the mobile device 20 would be communicated to the synchronization server, and the central node would maintain a record of the location of mobile device 20 as of the last synchronization operation, or as of the last location registration time, or would maintain it as of some period of time, for example, for the past week, past month or the like.

The location of the mobile device 20, as would be known by person of ordinary skill, could be obtained using a GPS device contained in a mobile device 20, or carried by a user device in communication with the mobile device 20.

In addition or in the alternative, the location information may be obtained with reference to the most recent base station 86a, 86b used by the mobile device 20 or the most recent Wi-Fi connection 71a or 71b used by the mobile device 20, or may be obtained using a triangulation procedure of more than one such base station, or more than one such Wi-Fi connection for finding the best signal with the mobile device 20, or some other such mobile device tracking operation.

The central node may store a record of such mobile device locations in a location archive so that a series of locations of the mobile device 20 may be retrieved and monitored. Accordingly, the user's desktop 90 could be used by a user, such as a parent or guardian, to track the location of a minor, or in case of emergency, could be used to locate a missing person or a person in jeopardy or the like. Also, a lost or stolen mobile device 20 could thus be found.

Figure 8:
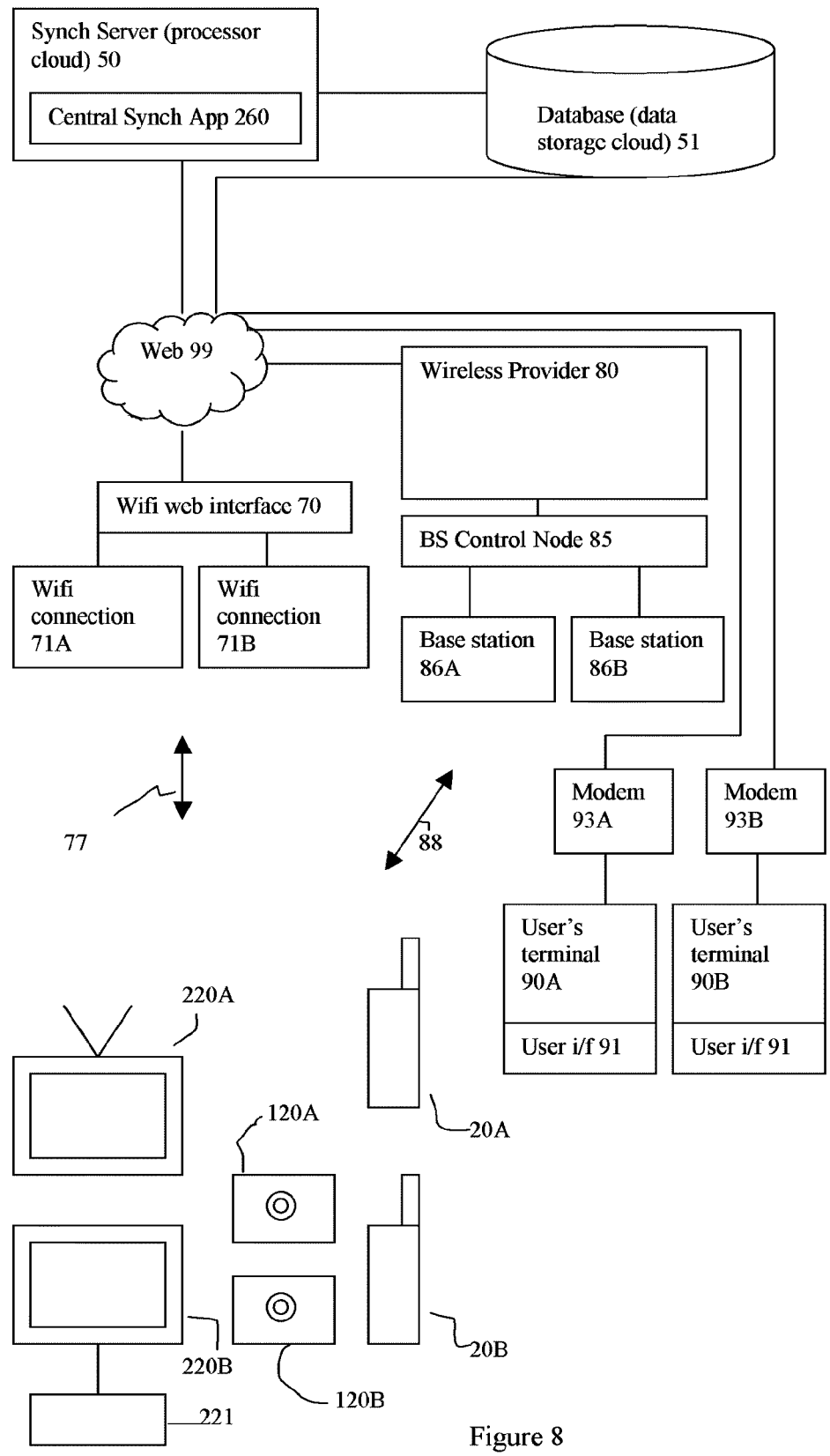
FIG. 8 illustrates other devices that may be connected and synchronized.

FIG. 8 illustrates other types of devices that may be synchronized via the central node. FIG. 8 illustrates mobile devices 20A and 20B which may both share user content by synchronization with the central node. Thus, each of mobile devices 20A and 20B may include a synchronization application 30 that may initiate synchronization with the central node independently or at the same time. Mobile devices 20A and 20B may belong to the same user and thus user may wish to automatically update user content stored on one mobile device with that stored on the other. Alternatively, the mobile devices 20A and 20B may belong to different users, such as members of a family, friends, business partners of the like who wish to share user content via synchronization automatically.

Also shown in FIG. 8 are cameras 120A and 120B which may also communicate via Wi-Fi connection 77 or via connection with a cellular network through cellular link 88. Also, cameras 120A and 120B may be connected through a wired connection through a desktop or a laptop terminal or other device that has connection to web 99 using a wired connection or via Wi-Fi connection 77 or via a wireless link 88 of a wireless cellular system. Thus, for example if the user has pictures on camera 120A that the user wishes to use as a screen saver on a mobile communication device, the photos or other types of pictures or graphical data stored on the camera 120A can be automatically synchronized with the mobile device 20A via the central node. Thus, cameras 120A and 120B may include a synchronization application that initiate synchronization via the central node or may respond to a synchronization initiated at the central node. Cameras 120A and 120B may initiate synchronization each time a synchronization is carried out between the mobile device 20 and the central node or may initiate synchronization at a time or following a period of time, or upon occurrence of an event that is programmed at the synchronization application residing in the camera. Also, devices 120A and 120B may be camcorders or digital video recorders or other types of equipment that captures photographic or video data.

FIG. 8 also illustrates televisions 220A and 220B that may be used to view user content stored at the central node or whose received broadcast content may be uploaded to the central node. Thus, broadcast content received by one or more televisions 220A and 220B, for example received via wireless television/radio frequency broadcast, via cable or via set top box (now shown), or received via the interne or via a Wi-Fi connection 71A, 71B, may be uploaded to the central node for storage at the central synchronization server 50 or at the database 51. Thus, if the user wishes to select broadcast TV content for viewing on the mobile communication device 20A or 20B, the content will be ported to the synchronization server 50 via web 99 through a wired or a wireless connection and then the user may view the content on the mobile communication device 20A/20B. One or more of televisions 220A and 220B may be conventional CRT television units, flat screen televisions, OLED, LCD, LED or plasma based displays, front projection or rear projection units or the like.

Also shown in FIG. 8 is an auxiliary device 221 connected to television 220B. Auxiliary device 221 may be a keyboard, computer, or a gaming device connected to television 220B using a wired or a wireless connection. Auxiliary device 221 may have its own display and controls, and thus content viewed or stored at the auxiliary device 221 may also be synchronized with the central node content in addition to or instead of the content viewed or stored at television 220B.

Also contemplated is a system in which many such devices are all synchronized at the central node such that upon selection by the user of the device, or of types of content of a device, all such designated user content may be synchronized at the central node to all other selected devices or to any device designated by the user. Thus, the user may wish to view pictures or video data or recordings captured by camera 120A, 120B on the mobile device 20A, 20B, and in addition or instead, on the television 220A, 220B.

Also, synchronization may be performed automatically each time user content for any designated synchronized device is changed, updated, added or deleted. Such event-driven synchronization may be performed in addition to or instead of synchronization at set time intervals or at pre-specified times. Thus, the user may wish to perform synchronization with a device such as a camera 120A, 120B, which is less frequently used or for which data stored is less frequently changed, added or deleted, or for which content files include larger amounts of data and thus require more bandwidth and storage space, only upon the occurrence of a content changing event, such as the addition, deletion or the editing of user content. Also, the user may wish to port user data or other content immediately only in one direction between designated devices. For example, the user may wish to view television content received by the television 22A on the mobile terminal 20, but not to view content of the mobile device on the television 220A and thus, the user may set for only one way synchronization.

Also, while shown as mobile communication devices 20A and 20B, cameras 120A, 120B, televisions 220A, 220B and television auxiliary device 221, other types of devices may also be used to view synchronized content or to supply synchronized content. For example, such platforms may include printer devices, medical surgical equipment, electronic pens, radio devices, electronic shavers/electronic personal care device, lighting systems/fixtures, refrigerators microwave ovens, security systems (home or business), air conditioning systems, heating systems, electronic book readers, home or business entertainment systems, headphones, gaming devices, electronic billboards/signs, cook top stoves, electronic picture frames, elevators, electronic tables, dishwashers, washer/dryer laundry units, small to mid size kitchen appliances, electronic planners, electronic calendars, car computer systems and dashboard displays, wall mounted electric systems, aviation systems, boating computer systems, electronic toothbrushes, digital recorders, DVD player, blue ray players, cable-satellite set-top box, device remote control units, handheld "sky caddie" (golf device), GPS golf cart with or without "sky caddie" built in home/auto alarm systems, car rear camera/obstacle detector, portable automobile TV, on-board bicycle racer computer, landline phones, electronic doors, paper shredder, electric reclining chair, treadmills and workout bikes, vending machines, ticketing machines, toll/commuter fair machines or turnpikes pedometer built into shoe, cash register, coin counting machines, DVD renting units, self checkout machines Thus, less memory may be needed for mobile communication device 20 because the two-way synchronization affords the user the ability to delete larger chunks of data, for example photos or videos captured by the mobile communication device 20. Thus, a more streamlined telephone or telephone memory may be obtainable.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for automatically synchronizing user content stored as mobile records by a mobile communication terminal with central records stored for the user by a central node remote from the mobile communication terminal, the system comprising a user content synchronization module at the mobile communication terminal and a central content synchronization mobile at the central node, the user content synchronization module comprising:

a synchronization controller configured to initiate a current synchronization operation;

a state comparator configured to identify, as a changed central record, any central records for the user changed, deleted or added since a last synchronization operation, and to identify, as a changed mobile record, any mobile records changed, deleted or added since the last synchronization operation, the last synchronization operation being a synchronization operation performed most recently prior to the current synchronization operation by the mobile communication device;

the state comparator being further configured to determine whether the changed central record is a corresponding record to the changed mobile record, the corresponding record being a record that refers to a different version of the same record than another record, and to identify, as a most recently modified record, only one record of a group consisting of the changed central record and the changed mobile record; and a command generator configured to generate a command queue comprising a command to update based on the most recently modified record, the command being a command sent to the central node to update the central records for the user when the most recently modified record is the changed mobile record, and the command being a command to the mobile communication terminal to update the mobile records when the most recently modified record is the changed central record; and the central content synchronization module at the central node comprising:

a user access module configured to provide access to the central records stored for the user and to add, change and delete the central records stored for the user according to user instruction received by the user access module; and an off-line storage module configured to synchronize the central records with a user device other than the mobile communication terminal for storage by the user device of the update records.

2. The system of claim 1, wherein the mobile records and the central records for the user include user contacts content data.

3. The system of claim 1, wherein the mobile records and the central records for the user include user contacts content data, user calendar content data, user ringtone data, user text message content data, and user photo content data.

4. The system of claim 1, wherein the mobile records for the user and the central records include user contacts content data, user calendar content data, user ringtone data, user text message content data, user photo content data, user voice mail content data, user video content data and user notes content data.

5. The system of claim 1, wherein the mobile communication terminal is a mobile telephone configured to communicate via a cellular network.

6. The system of claim 1, wherein the mobile communication terminal receives content data from the central node as XML data.

7. The system of claim 1, wherein the synchronization controller is configured to initiate automatically the current synchronization operation regularly after a predetermined time period.

8. The system of claim 7, further comprising a user preference module configured to receive and to store a user-specified time period, wherein the predetermined time period is the user-specified time period and the predetermined time period is at least 30 minutes.

9. The system of claim 1, further comprising a user preference module configured to receive and to store user-specified field information, wherein the current synchronization operation is limited to fields of the mobile records specified by the user-specified field information, the fields of the mobile records including user contacts, user calendar, user ringtone, user text message, and user photo content data.

10. The system of claim 1, further comprising a position relay module configured to transmit to the central node for storing in the central records for the user a current position of the mobile communication device.

11. The system of claim 1, wherein the position relay module is configured to transmit the current position at a time of the current synchronization operation.

12. The system of claim 11, wherein the position relay module is configured to retrieve the current position from a GPS unit of the mobile communication device.

13. The system of claim 1, the user content synchronization module further comprising a remote content manager configured to delete mobile records at the mobile communication terminal upon the receipt of a wipe command from the central node.

14. The system of claim 13, wherein the mobile records deleted include user contacts content data, user calendar content data, user ringtone data, user text message content data, and user photo content data.

15. A processor-readable medium included in the mobile communication terminal of the system of claim 1, the medium incorporating a program of instructions configured as the user content synchronization module.

16. In combination, the processor-readable medium of claim 15 and a second processor-readable medium incorporating a program of instructions configured to be run at the central node for managing the central node during the current synchronization operation.

17. The system of claim 1, further comprising a second processor-readable medium incorporating a program of instructions configured to be run at the central node for managing the central node during the current synchronization operation, and configured to contact the synchronization controller to command initiation of the current synchronization operation.

18. A processor-readable medium included in the user device of the system of claim 1, the medium incorporating a program of instructions configured to perform synchronization with the central node.

19. The processor-readable medium of claim 18, wherein the synchronization by the user device is initiated by the user device.

20. The processor-readable medium of claim 18, wherein the synchronization is performed every time a current synchronization operation is performed.

21. The system of claim 1, wherein the current synchronization operation is initiated automatically upon a change, deletion or addition to the user content.

22. A system for automatically synchronizing user content stored as mobile records by the mobile communication terminal with central records stored for the user by a central node remote from the mobile communication terminal, the system at the mobile communication terminal comprising a user content synchronization module comprising:

a synchronization controller configured to initiate a current synchronization operation;

a state comparator configured to identify, as a changed central record, any central records for the user changed, deleted or added since a last synchronization operation, and to identify, as a changed mobile record, any mobile records changed, deleted or added since the last synchronization operation, the last synchronization operation being a synchronization operation performed most recently prior to the current synchronization operation by the mobile communication device;

the state comparator being further configured to determine whether the changed central record is a corresponding record to the changed mobile record, the corresponding record being a record that refers to a different version of the same record than another record, and to identify, as a most recently modified record, only one record of a group consisting of the changed central record and the changed mobile record;

a command generator configured to generate a command queue comprising a command to update based on the most recently modified record, the command being a command sent to the central node to update the central records for the user when the most recently modified record is the changed mobile record, and the command being a command to the mobile communication terminal to update the mobile records when the most recently modified record is the changed central record; and a position relay module configured to transmit to the central node for storing in the central records for the user a current position of the mobile communication device.

23. A method of managing user content stored by a mobile communication terminal, the method comprising:

automatically first synchronizing user content stored as mobile records by the mobile communication terminal with central records stored for the user by a central node remote from the mobile communication terminal, the first synchronizing comprising:

identifying, as a changed central record, any central records for the user changed, deleted or added since a last synchronization operation, and to identify, as a changed mobile record, any mobile records changed, deleted or added since the last synchronization operation, the last synchronization operation being a synchronization operation performed most recently prior to the current synchronization operation by the mobile communication device;

determining whether the changed central record is a corresponding record to the changed mobile record, the corresponding record being a record that refers to a different version of the same record than another record, and to identify, as a most recently modified record, only one record of a group consisting of the changed central record and the changed mobile record; and generating a command queue comprising a command to update based on the most recently modified record, the command being a command sent to the central node to update the central records for the user when the most recently modified record is the changed mobile record, and the command being a command to the mobile communication terminal to update the mobile records when the most recently modified record is the changed central record; and automatically second synchronizing the central node with an additional user device, the second synchronizing comprising:

identifying, as a changed central record, any central records for the user changed, deleted or added since the last second synchronization operation, and to identify, as a changed additional user device record, any mobile records changed, deleted or added since the last synchronization operation, the last second synchronization operation being a second synchronization operation performed most recently prior to the current second synchronization operation by the additional user device;

determining whether the changed central record is a corresponding record to the changed additional user device record, the corresponding record being a record that refers to a different version of the same record than another record, and to identify, as a most recently modified record, only one record of a group consisting of the changed central record and the changed additional user device record; and generating a command queue comprising a command to update based on the most recently modified record, the command being a command sent to the central node to update the central records for the user when the most recently modified record is the changed additional user device record, and the command being a command to the additional user device to update the additional user device records when the most recently modified record is the changed central record.

24. The method of claim 23, wherein the additional user device is a desktop or laptop computer communicating with the central node via a modem.

25. The method of claim 23, wherein the additional user device is handheld device including a processor communicating with the central node via a Wi-Fi system.

26. The method of claim 23, storing at the additional user device the updated additional user device records for use off-line.

27. The method of claim 23, further comprising transmitting to the central node for storing in the central records for the user a current position of the mobile communication device.

28. The method of claim 27, wherein the current position is determined at a time of the current synchronization operation.

29. The method of claim 27, wherein the current position is determined from a GPS unit of the mobile communication device.

30. The method of claim 27, wherein the current position is determined based on cellular base station or Wi-Fi port signaling.

31. The method of claim 23, further comprising deleting the content stored by the mobile communication terminal upon receipt of a wipe command from the central node.

32. A system of managing user content stored by a mobile communication terminal, the system comprising:

means for receiving a user selection designating, as user content, at least one field of mobile user content records stored by the mobile communication terminal;

means for automatically first synchronizing the user content with central records stored for the user by a central node remote from the mobile communication terminal, the first synchronizing comprising:

means for identifying, as a changed central record, any central records of the at least one designated field for the user changed, deleted or added since a last synchronization operation, and for identifying, as a changed mobile record, any mobile records of the at least one designated field changed, deleted or added since the last synchronization operation, the last synchronization operation being a synchronization operation performed most recently prior to the current synchronization operation by the mobile communication device;

means for determining whether the changed central record is a corresponding record to the changed mobile record, the corresponding record being a record that refers to a different version of the same record than another record, and for identifying, as a most recently modified record, only one record of a group consisting of the changed central record and the changed mobile record; and means for generating a command queue comprising a command to update based on the most recently modified record, the command being a command sent to the central node to update the central records for the user when the most recently modified record is the changed mobile record, and the command being a command to the mobile communication terminal to update the mobile records when the most recently modified record is the changed central record; and means for automatically second synchronizing the central node with an additional user device, the second synchronizing comprising:

means for identifying, as a changed central record, any central records of the at least one designated field for the user changed, deleted or added since the last second synchronization operation, and for identifying, as a changed additional user device record, any mobile records of the at least one designated field changed, deleted or added since the last synchronization operation, the last second synchronization operation being a second synchronization operation performed most recently prior to the current second synchronization operation by the additional user device;

means for determining whether the changed central record is a corresponding record to the changed additional user device record, the corresponding record being a record that refers to a different version of the same record than another record, and for identifying, as a most recently modified record, only one record of a group consisting of the changed central record and the changed additional user device record; and means for generating a command queue comprising a command to update based on the most recently modified record, the command being a command sent to the central node to update the central records for the user when the most recently modified record is the changed additional user device record, and the command being a command to the additional user device to update the additional user device records when the most recently modified record is the changed central record.

33. The system of claim 32, further comprising means for storing at the additional user device the updated additional user device records for use off-line.

* * * * *